United States Patent
Cobler

(10) Patent No.: US 12,057,896 B2
(45) Date of Patent: Aug. 6, 2024

(54) DEVICES, SYSTEMS AND METHODS FOR SENSING AND TRACING PROXIMITY CONTACTS

(71) Applicant: Cascodium LLC, Andover, MA (US)

(72) Inventor: Patrick J. Cobler, Nashua, NH (US)

(73) Assignee: CASCODIUM LLC, Andover, MA (US)

( * ) Notice: Subject to any disclaimer, the term of this patent is extended or adjusted under 35 U.S.C. 154(b) by 497 days.

(21) Appl. No.: 17/314,458

(22) Filed: May 7, 2021

(65) Prior Publication Data

US 2021/0348949 A1  Nov. 11, 2021

Related U.S. Application Data

(60) Provisional application No. 63/028,347, filed on May 21, 2020, provisional application No. 63/021,638, filed on May 7, 2020.

(51) Int. Cl.
*H04W 4/02* (2018.01)
*G01D 5/20* (2006.01)
(Continued)

(52) U.S. Cl.
CPC ............... *H04B 5/73* (2024.01); *G01D 5/20* (2013.01); *G01V 3/10* (2013.01); *H04B 5/24* (2024.01); *H04B 5/48* (2024.01); *H04W 76/10* (2018.02)

(58) Field of Classification Search
None
See application file for complete search history.

(56) References Cited

U.S. PATENT DOCUMENTS 5,912,925 A  6/1999 Palermo et al.
5,982,764 A  11/1999 Palermo et al.
(Continued)

FOREIGN PATENT DOCUMENTS

EP   2040086 B1   8/2018
WO   199637052 A1  11/1996
WO   2011112795 A1  9/2011

OTHER PUBLICATIONS

Foy, K. "Bluetooth Signals from your Smartphone Could Automate Covid-19 Contact Tracing While Preserving Privacy". MIT News, Apr. 8, 2020.
(Continued)

*Primary Examiner* — Tuan A Tran
(74) *Attorney, Agent, or Firm* — Grossman, Tucker, Perreault & Pfleger, PLLC

(57) ABSTRACT

Systems and methods for sensing and tracing proximity contacts use a magnetic field detection or coupling technology where the detection range between proximate devices may be accurately determined. The detection range may be accurately determined, for example, by generating and detecting a defined magnetic field range and/or by measurement of the received magnetic field strength and direction within an undefined magnetic field range. Proximity sensing devices perform a proximity magnetic field detection when located within a defined, generated magnetic field during a proximity contact interaction with another device that is generating a magnetic field. The magnetic fields generated and detected are generated to behave as quasistatic fields, in contrast to radios that generate and detect radiated, dynamic, electro-magnetic fields.

17 Claims, 4 Drawing Sheets

(51) Int. Cl.
*G01V 3/10* (2006.01)
*H04B 5/00* (2024.01)
*H04B 5/02* (2006.01)
*H04B 5/24* (2024.01)
*H04B 5/48* (2024.01)
*H04B 5/73* (2024.01)
*H04W 4/029* (2018.01)
*H04W 76/10* (2018.01)

(56) References Cited

U.S. PATENT DOCUMENTS

| | | | |
|---|---|---|---|
| 7,035,608 B2 | 4/2006 | Palermo et al. | |
| 7,142,811 B2 | 11/2006 | Terranova et al. | |
| 7,215,924 B2 | 5/2007 | Palermo et al. | |
| 7,236,741 B2 | 6/2007 | Palermo et al. | |
| 7,532,901 B1 | 5/2009 | LaFranchise et al. | |
| 7,574,173 B2 | 8/2009 | Terranova et al. | |
| 8,049,614 B2 | 11/2011 | Kahn et al. | |
| 8,410,775 B2 | 4/2013 | LaFranchise et al. | |
| 8,446,275 B2 | 5/2013 | Utter, II | |
| 8,527,688 B2 | 9/2013 | Chatterjee et al. | |
| 8,626,130 B2* | 1/2014 | Wesley | G07C 9/28 455/412.2 |
| 8,867,993 B1 | 10/2014 | Perkins et al. | |
| 8,880,100 B2 | 11/2014 | Dobyns | |
| 8,929,809 B2 | 1/2015 | Dobyns | |
| 9,159,371 B2* | 10/2015 | Ross | G11B 15/026 |
| 9,392,409 B2* | 7/2016 | Moir | H04W 4/023 |
| 9,397,726 B2 | 7/2016 | Dobyns | |
| 9,400,985 B2 | 7/2016 | Dobyns | |
| 9,455,771 B2 | 9/2016 | Dobyns | |
| 9,560,505 B2 | 1/2017 | Dobyns | |
| 9,621,227 B2 | 4/2017 | Dobyns et al. | |
| 9,621,228 B2 | 4/2017 | Dobyns et al. | |
| 9,705,564 B2 | 7/2017 | Dobyns et al. | |
| 9,722,674 B2 | 8/2017 | Dobyns | |
| 9,740,823 B2 | 8/2017 | Breazeale, Jr. | |
| 9,780,837 B2 | 10/2017 | Dobyns et al. | |
| 9,820,106 B2* | 11/2017 | Farley | H04W 4/023 |
| 9,838,082 B2 | 12/2017 | Dobyns et al. | |
| 9,875,635 B2 | 1/2018 | Sawada | |
| 9,882,413 B2 | 1/2018 | Jeong | |
| 9,960,813 B2 | 5/2018 | Dobyns | |
| 9,973,898 B2* | 5/2018 | Farley | H04W 4/023 |
| 9,979,800 B2* | 5/2018 | Berookhim | G06V 30/242 |
| 9,980,090 B2* | 5/2018 | Gujral | H04W 4/023 |
| 10,038,475 B2 | 7/2018 | Dobyns et al. | |
| 10,045,184 B2* | 8/2018 | Padgett | G07C 9/28 |
| 10,084,512 B2 | 9/2018 | Dobyns et al. | |
| 10,103,786 B2 | 10/2018 | Dobyns | |
| 10,117,050 B2 | 10/2018 | Dobyns | |
| 10,122,414 B2 | 11/2018 | Dobyns et al. | |
| 10,164,685 B2 | 12/2018 | Dobyns et al. | |
| 10,164,688 B2 | 12/2018 | Rothkopf | |
| 10,251,610 B2 | 4/2019 | Parthasarathy et al. | |
| 10,566,835 B2* | 2/2020 | Kim | H02J 13/00006 |
| 2002/0062203 A1 | 5/2002 | Gilboa | |
| 2006/0036619 A1 | 2/2006 | Fuerst et al. | |
| 2010/0117838 A1 | 5/2010 | Humbard | |
| 2011/0025464 A1 | 2/2011 | Geng et al. | |
| 2011/0251815 A1 | 10/2011 | Bar-Tal | |
| 2012/0026836 A1* | 2/2012 | Scripca | G01S 15/93 367/99 |
| 2019/0141476 A1 | 5/2019 | Dobyns | |
| 2019/0288542 A1 | 9/2019 | Konanur | |
| 2019/0356178 A1 | 11/2019 | Widmer et al. | |
| 2019/0356358 A1 | 11/2019 | Dobyns et al. | |
| 2019/0373411 A1 | 12/2019 | Dobyns | |
| 2019/0386707 A1 | 12/2019 | Dobyns | |
| 2020/0021333 A1 | 1/2020 | Dobyns et al. | |
| 2020/0044696 A1 | 2/2020 | Dobyns | |
| 2020/0067569 A1 | 2/2020 | Dobyns et al. | |
| 2020/0076473 A1 | 3/2020 | Dobyns et al. | |
| 2020/0083929 A1 | 3/2020 | Dobyns et al. | |
| 2020/0083930 A1 | 3/2020 | Dobyns et al. | |
| 2020/0090515 A1* | 3/2020 | Torres | G08G 1/14 |
| 2020/0092674 A1 | 3/2020 | Dobyns | |
| 2020/0112342 A1 | 4/2020 | Dobyns et al. | |
| 2021/0058736 A1* | 2/2021 | Ghazzaoui | H04W 4/80 |

OTHER PUBLICATIONS

International Search Report and Written Opinion from related PCT application PCT/US2021/031345, mailed Aug. 13, 2021. 14 pages.

* cited by examiner

DEVICES, SYSTEMS AND METHODS FOR SENSING AND TRACING PROXIMITY CONTACTS

RELATED APPLICATIONS

The present application claims the benefit of U.S. Provisional Application Ser. No. 63/021,638 filed May 7, 2020 and U.S. Provisional Application Ser. No. 63/028,347 filed May 21, 2020, both of which are fully incorporated herein by reference.

TECHNICAL FIELD

The present disclosure relates to devices, systems and methods for sensing and tracing proximity contacts and more particularly, to devices, systems and methods for contact tracing of individuals at risk of transmitting an infectious disease.

BACKGROUND INFORMATION

Contact tracing is important for tracking and preventing the spread of infectious disease. An automated contact tracing system generally should provide the ability for nearby individuals to detect relative location, or proximity, to one another. One solution is to use mobile phones to provide contact tracing functions where the mobile phone is used as a device for detecting proximity. Mobile phones are considered desirable for widespread contact tracing because a large percentage of the population already has these devices. Mobile phones have embedded GPS functionality and the cell network providers have access to location data from their cellular towers. Both of these methods, however, are unable to detect phone locations with enough accuracy to effectively determine proximity (e.g., within 6 feet). In addition, there are privacy concerns with using this data to extract individual location information.

Another proposed solution is to use the Bluetooth radios contained in most modern mobile devices to detect proximity to other devices carried by other individuals. One such system summarized at the MIT News website (https://news.mit.edu/2020/bluetooth-covid-19-contact-tracing-0409) uses encrypted keys and current cell phone technology. Although this system has some strengths, there are some practical disadvantages to using mobile phones and radio signals. First, radio signals can have significant interaction with their environment and significant directional dependence resulting in variable signal strength to nearby devices, even when the distance between devices is fixed. In any given orientation and environment between nearby devices, it may not be possible to accurately determine proximity using these signals. Further, in a building with walls, the radio signals can propagate through walls and indicate proximate location between two phones that were never even in the same room. These signals can also bounce off, or reflect from, surrounding materials and cause multipath effects making estimates of proximal distance inaccurate. These effects can cause "false positives" for detection of contacts, which, if widespread would seriously degrade the usefulness of such a system.

Second, there is significant concern that users may not voluntarily opt in to the use of an application on their phone designed to track their proximal location to others at all times. Even if they are told that the systems have been purposefully designed to protect their individual privacy, there may be significant distrust of technology specifically designed to track individuals and their interactions with others. Third, mobile phones are not allowed in every place people may travel. For example, certain secure locations do not allow phones on-site, or for certain sanitary environments or certain sensitive electromagnetic environments (such as on a commercial aircraft), the use of cell phones may not be allowed.

Other technologies that might be used for proximity detection, such as optical or acoustic signals, may have line of sight problems and the signals may be blocked by the body of the individual. Such technologies may not reliably detect proximity contacts. Other technologies, such as near field communication (NFC) commonly provided by mobile phones today, have a detection range that is much too small to be of use for proximity detection for contact tracing to prevent transmission of an infectious disease.

SUMMARY

According to one aspect of the present disclosure, a system is provided for sensing and tracing proximity contacts. The system includes a plurality of proximity sensing devices configured to perform a proximity magnetic communication when located within a magnetic field range during a proximity contact interaction. The proximity magnetic communication includes at least a device identifier of the proximity sensing devices performing the proximity magnetic communication. Each of the proximity sensing devices is also configured to store proximity contact data including at least the received device identifiers. The system also includes a contact tracing system configured to communicate with the proximity sensing devices and to log proximity contact data received from each of the proximity sensing devices. The proximity contact data includes a device identifier for each proximity sensing device and the received device identifiers received by each proximity sensing device from other proximity sensing devices as a result of proximity magnetic communications.

According to another aspect of the present disclosure, a method is provided for sensing and tracing proximity contacts. The method includes: sensing proximity contact interactions using proximity sensing devices worn by individuals, wherein the proximity contact interactions are sensed when the proximity sensing devices are within a magnetic field range and perform a proximity magnetic communication to communicate device identifiers; storing proximity contact data in the proximity sensing devices when the proximity contact interactions are sensed, wherein the proximity contact data includes at least device identifiers received during proximity magnetic communications from the proximity sensing devices within the magnetic field range; communicating the proximity contact data from the proximity sensing devices to a contact tracing system; storing the proximity contact data in the contact tracing system together with individual identifiers associated with the respective individuals wearing the proximity sensing devices; and searching the proximity contact data to identify proximity contact interactions for a selected individual and to identify contacted individuals associated with the proximity contact interactions for the selected individual.

According to a further aspect of the present disclosure, a proximity sensing device includes a magnetic induction transceiver. The magnetic induction transceiver includes at least one transducer configured to generate a quasistatic magnetic field extending over a magnetic field range and configured to generate current and/or voltage when located within a quasistatic magnetic field generated by another transducer. The transceiver further includes transmit circuitry coupled to the transducer and configured to drive the transducer with a modulated electrical signal and receive circuitry coupled to the transducer and configured to receive a modulated electrical signal when the transducer detects a magnetic field generated by a transducer in another proximity sensing device. The transceiver further includes a processor coupled to the transmit circuitry and to the receive circuitry and configured to process a transmit digital signal encoding at least a device identifier for transmission by the transmit circuitry and configured to process a received digital signal to decode a received device identifier. The transceiver further includes a memory configured to store proximity data including at least the received device identifiers.

BRIEF DESCRIPTION OF THE DRAWINGS

These and other features and advantages will be better understood by reading the following detailed description, taken together with the drawings wherein.

DETAILED DESCRIPTION

Figure 1:
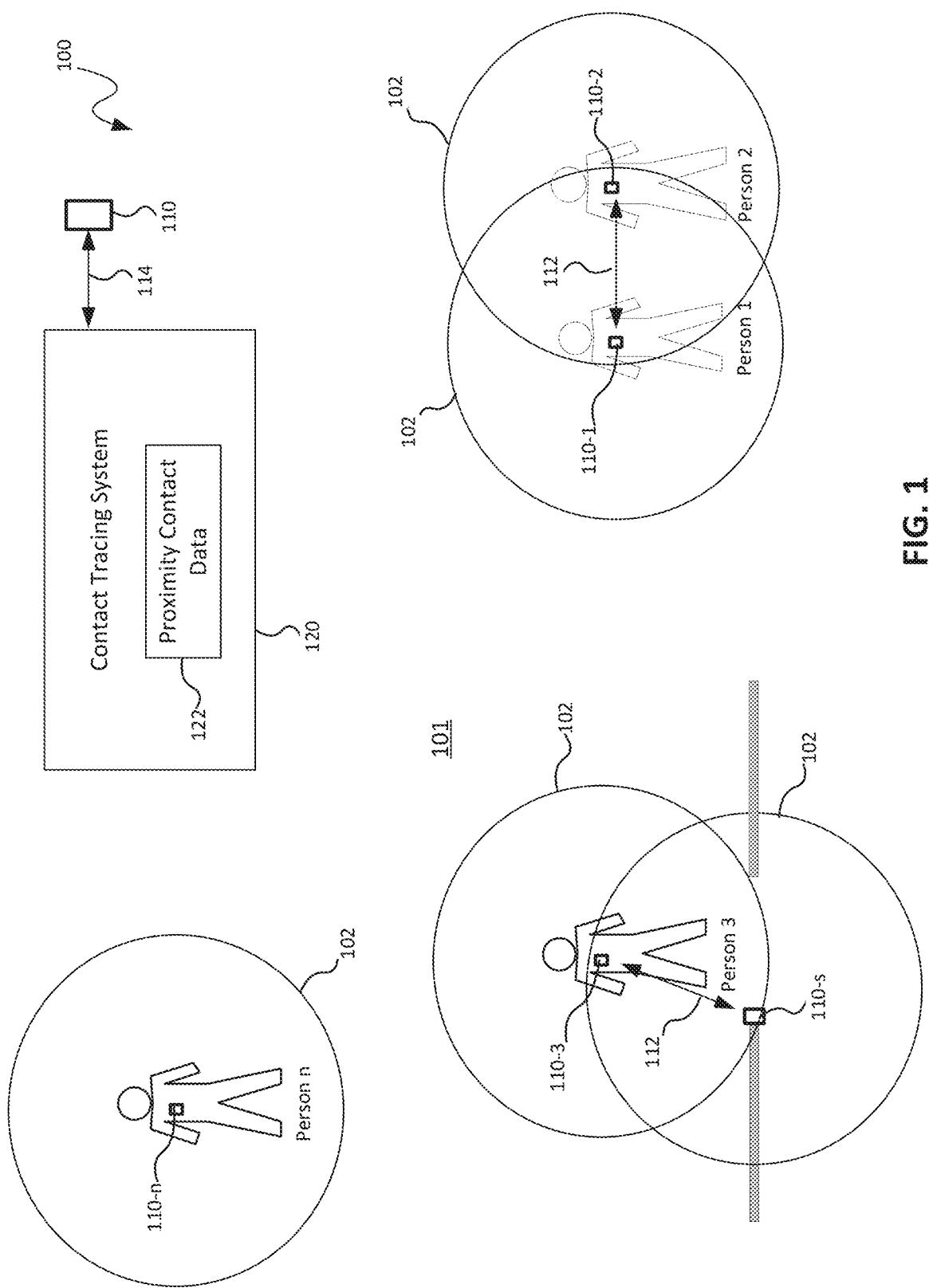
FIG. 1 is a schematic diagram illustrating a system for sensing and tracing proximity contacts, consistent with embodiments of the present disclosure.

Systems and methods for sensing and tracing proximity contacts, consistent with embodiments described herein, use a magnetic field detection or coupling technology where the detection range between proximate devices may be accurately determined. The detection range may be accurately determined, for example, by generating and detecting a defined magnetic field range and/or by measurement of the received magnetic field strength and direction within an undefined magnetic field range. Proximity sensing devices perform a proximity magnetic field detection when located within a defined, generated magnetic field during a proximity contact interaction with another device that is generating a magnetic field. The strength and/or direction of the magnetic field generated by a transmitting device may be known by a receiving device to allow the receiving device to determine the detection range from the detected magnetic field. The magnetic fields generated and detected are generated to behave as quasistatic fields, in contrast to radios that generate and detect radiated, dynamic, electro-magnetic fields.

In an embodiment, the proximity magnetic field detection may also involve a communication of data between devices, referred to as a proximity magnetic communication. The proximity sensing devices may store proximity contact data including device identifiers received from other devices during each proximity magnetic communication. A contact tracing system records the proximity contact data from the proximity sensing devices and may be used to determine the proximity contact interactions for each of the proximity sensing devices. One application for such a system and method is contact tracing to mitigate the transmission of infectious disease, and a defined magnetic field range may correspond to a transmission range for the infectious disease.

The devices, systems and methods described herein are particularly suited for narrower applications (as opposed to widespread contact tracing) where numerous people interact within an area and may be in close proximity. Such narrower applications include business and other large organizations that employ or host people in a facility or venue including, without limitation, factories, warehouses, distribution centers, restaurants, entertainment venues, sports arenas or venues, theatres, retail stores, malls, school campuses and facilities, and the like. In these applications, the devices, systems and methods described herein can improve the safety of the employees and/or visitors by recording and tracing their proximal contact with others within the facility or venue.

In these applications, the proximity sensing devices are wearable by the individuals (e.g., the employees or patrons) to determine proximity to other sensing devices and log data associated with these proximity contact interactions. The logged data may then be stored in the contact tracing system to track the number and duration of interactions between occupants throughout the facility or venue. When an individual is determined to be at risk for an infectious disease (e.g., a symptom, exposure, diagnosis or a positive test result), the contact data may be used (e.g., by the employer or operator of the facility or venue) to take actions (e.g., isolation and/or quarantine, further testing, notification, etc.) to protect those (e.g., other employees, visitors, vendors, patrons, students, etc.) who have been in contact with the at-risk individual. Such a system may be particularly beneficial to an employer to protect its overall workforce from further transmission, thereby minimizing the impact to its operations.

As used herein, "transducer" refers to a device or component that converts electrical energy into a quasistatic magnetic field. One example of a "transducer" includes coils, although this is not a limitation of the present disclosure. As used herein, a "transceiver" refers to a device that performs both a transmitting and receiving function using one or more transducers to generate and detect quasistatic magnetic fields. As used herein, "proximity contact interaction" refers to an interaction between devices and/or individuals wearing such devices within a defined proximity range and does not require physical contact. Determining that a proximity contact interaction has occurred within a defined proximity range may be based on a detection within a defined magnetic field range and/or based on estimating a distance by measuring received magnetic field strength and/or direction within an undefined magnetic field range. As used herein, "defined magnetic field range" is a range of a quasistatic magnetic field that is capable of being used for magnetic field detection and/or communication of information and that falls off rapidly with distance. As used herein, "proximity magnetic field detection" refers to a detection of a magnetic field having a defined magnetic field range and "proximity magnetic communication" refers to a discrete communication of information between devices using a quasistatic magnetic field having a defined magnetic field range.

Referring to FIG. 1, a proximity contact sensing and tracing system 100, consistent with embodiments of the present disclosure, generally includes a plurality of proximity sensing devices 110-1 to 110-n worn by, carried by or otherwise affixed to individuals being tracked (Person 1, Person 2, . . . Person n) within a monitored area 101. Each of the proximity sensing devices 110-1 to 110-n has a defined magnetic field range 102 and is configured to perform proximity magnetic communications 112 with other sensing devices when located within that range 102, as will be described in greater detail below. The system 100 may also include one or more static proximity sensing devices 110-s located at fixed locations within the monitored area 101 (e.g., within a doorway or entrance into the area 101 or a touch point in the area 101) to track the proximity of the individuals relative to that particular location (e.g., to track when the individuals enter the area 101 or interact with the touch point in the area 101). Each of the proximity sensing devices 110-1 to 110-n, 110-s is configured to perform the proximity magnetic communications 112 with any of the other proximity sensing devices 110-1 to 110-n, 110-s when located within the range 102, i.e., during a proximity contact interaction.

In embodiments, each of the proximity sensing devices 110-1 to 110-n, 110-s have an associated device identifier and are configured to transmit and receive these device identifiers using the proximity magnetic communication 112 with another sensing device. The proximity sensing devices 110-1 to 110-n, 110-s are also configured to store proximity contact data associated with the proximity contact interaction including at least the received device identifiers. The proximity contact data may also include other data characterizing the proximity contact interaction including, without limitation, a time stamp associated with a particular proximity magnetic communication 112, a time period for or duration of a particular proximity magnetic communication 112, and a transmit and/or received signal strength of a particular proximity magnetic communication 112.

The proximity sensing devices 110-1 to 110-n may be configured as a wearable device, such as a badge, that is worn or carried by the individual. In the application of mitigating transmission of infectious disease, the wearable proximity sensing devices 110-1 to 110-n may have a defined magnetic range 102 that corresponds to a transmission range of the infectious disease, for example, at least 6 feet and more specifically 6 to 12 feet. The wearable device may be configured to be worn or carried with the same general orientation by each of the users in order to facilitate the proximity magnetic communication, as will be described in greater detail below. The wearable device may be incorporated into an article of clothing or other accessory worn by an individual, such as a hat, belt, eyewear, or shoes. The wearable device may also be a wrist band for securing to the wrist of the user. The proximity sensing devices 110-1 to 110-n may also be unique to the individuals using the devices. Alternatively or additionally, the proximity sensing devices may be configured to be sanitized after use.

In some embodiments, the proximity sensing devices 110-1 to 110-n are configured to only provide the proximity sensing function and store the proximity contact data and do not include other functionality and other data such as personal data for the individual. In other embodiments, the proximity sensing device may be configured with other functionality such as other functionality provided by an employee badge. The proximity sensing device may also be implemented in an existing electronic device carried by the individual, such as a mobile phone.

The static proximity sensing devices 110-s may be used at touch points, such as on or near a refrigerator, a microwave, or a water cooler in an office or factory, that are commonly frequented within the area 101 to track when individuals come into contact with those locations. In the application of mitigating transmission of infectious disease, the static proximity sensing devices 110-s used at touch points may have a defined magnetic field range 102 that is more limited (e.g., 3 to 4 ft.) to infer closer proximity contact interactions relative to the touch points. The proximity contact data recorded by the static proximity sensing devices 110-s used at touch points may be used to determine proximity contact interactions, even when occurring at different times, between the individuals and the touch points. The static proximity sensing device may use power from a permanently connected power source instead of a battery to power its operation.

A contact tracing system 120 receives and stores the proximity contact data 122 (e.g., in a central database) logged by the proximity sensing devices 110-1 to 110-n, 110-s over one or more communication link(s) 114. The communication links 114 may include any wired or wireless communication link including, without limitation, WiFi, Bluetooth, magnetic communication, Ethernet, CAN, and USB. The communication link(s) 114 may be directly from the proximity sensing devices 110-1 to 110-n, 110-s to the contact tracing system 120 or may be indirectly via another device, such as a mobile phone or computer used by the individual. The contact tracing system 120 may be implemented on one or more computer systems located at the area 101 being monitored and/or at remote locations (e.g., in the cloud). The static proximity sensing devices 110-s may have a hard-wired connection for establishing the communication link 114 to the contact tracing system 120 and for powering the static proximity sensing devices 110-s. In one example, power over ethernet may be used.

The proximity data from the proximity sensing devices 110-1 to 110-n, 110-s may be transferred to and stored in the contact tracing system 120 periodically. In a factory or other such facility, for example, the proximity sensing devices 110-1 to 110-n worn by the users may be connected to the contact tracing system 120 daily (e.g., at the end of the workday) to upload the proximity contact data 122. The proximity data from the proximity sensing devices 110-1 to 110-n, 110-s may also be transferred to and stored the contact tracing system 120, for example, in order for the user to exit the monitored area 101. The proximity data from the proximity sensing devices 110-1 to 110-n may also be logged or stored in the contact tracing system 120 in other manners, such as whenever each such device is within the range 102 of a static proximity sensing device 110-s.

Figure 2:
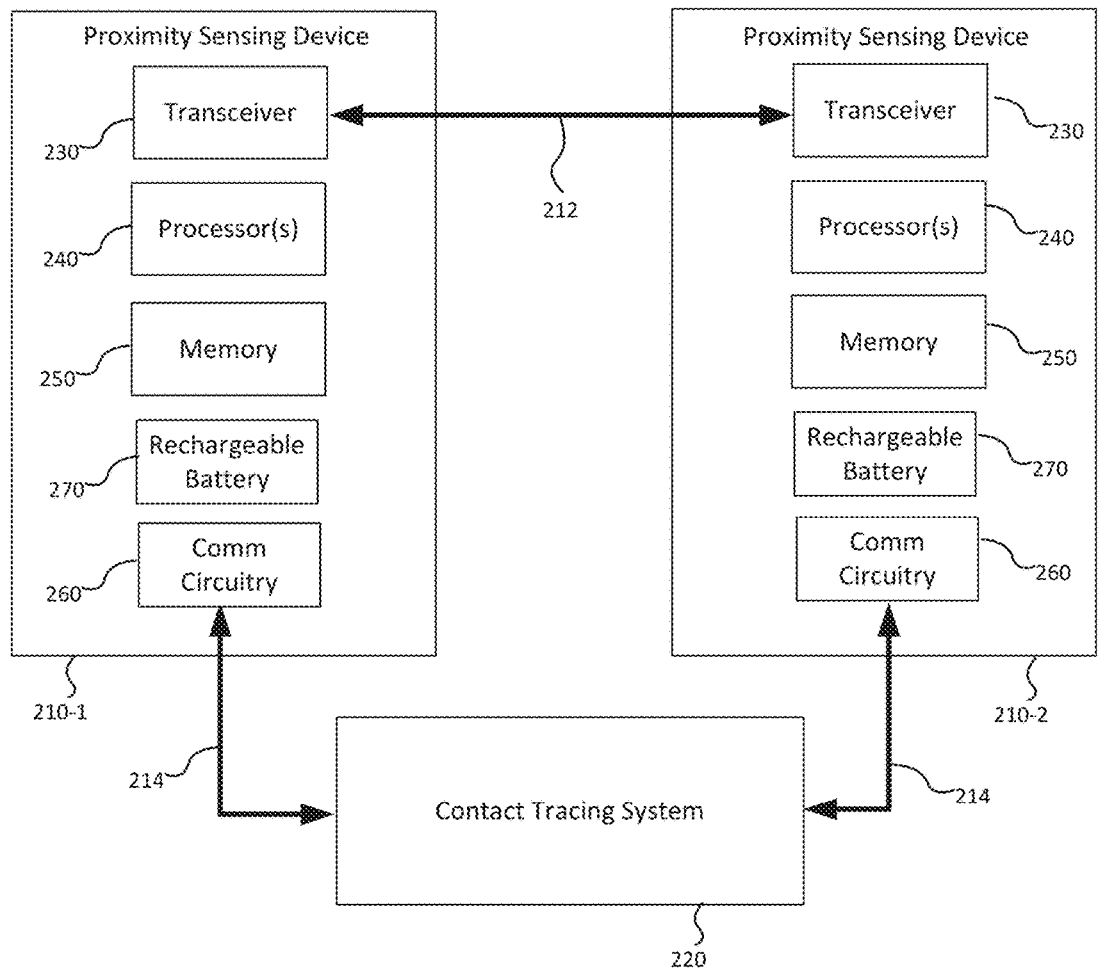
FIG. 2 is a schematic diagram of proximity sensing devices communicating with each other and with a contact tracing system, consistent with embodiments of the present disclosure.
Figure 3:
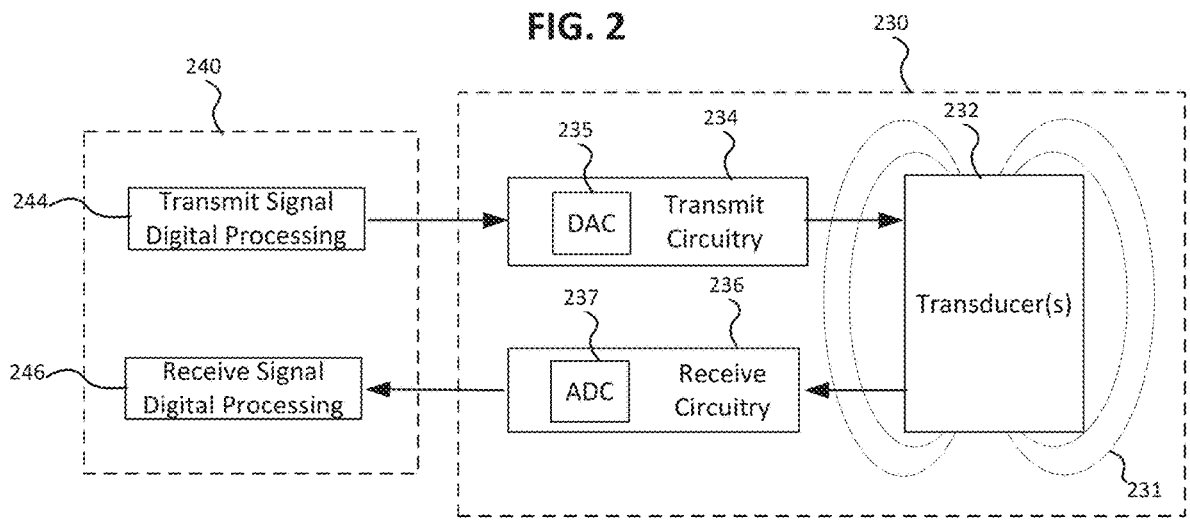
FIG. 3 is a schematic diagram of circuitry in a proximity sensing device, consistent with embodiments of the present disclosure.

Referring to FIGS. 2 and 3, an embodiment of a proximity sensing device 210 is described in greater detail. In this embodiment, the proximity sensing device 210 includes a magnetic induction transceiver 230, one or more processors 240, a memory 250, communication circuitry 260, and a rechargeable battery 270. The magnetic induction transceiver 230 is configured to transmit and receive data using modulation of magnetic fields to establish a proximity magnetic communication 212, as will be described in greater detail below. The one or more processors 240 may include any known microprocessors for processing data and are configured to process the data transmitted and received by the transceiver 230. The memory 250 may include any known memory for storing data and is configured to store proximity contact data including at least the received device identifiers, as will be described in greater detail below.

The communication circuitry 260 may include any known circuitry for implementing a wired or wireless communication with another computing device or system and is configured to communicate with a contact tracing system 220 via a wired or wireless communication link 214. The communication circuitry 260 may also be configured to communicate with communication circuitry in other proximity sensing devices. Examples of the communication circuitry 260 include, without limitation, WiFi circuitry, USB circuitry, Ethernet circuitry, CAN circuitry, and Bluetooth circuitry.

The rechargeable battery 270 may include known rechargeable batteries capable of providing sufficient power to provide the proximity magnetic communication over the defined magnetic field range, as will be described in greater detail below. The rechargeable battery 270 may be recharged, for example, when the proximity sensing device 210 is connected to the contact tracing system 220 for uploading proximity contact data.

As shown in FIG. 3, an embodiment of the magnetic induction transceiver 212 includes one or more transducers 232 that convert an electric current and/or voltage into a magnetic field for the transmitting function and convert a magnetic field (i.e., from a transducer in another proximity sensing device) into an electric current and/or voltage for the receiving function. In one example, the transducer(s) 232 include at least one wire coil, for example, wound around a magnetically permeable material, such as a ferrite rod or core. In other embodiments, multiple transducers 232 may be used and may be orthogonally arranged to improve the reliability of the magnetic communication independent of relative orientation of the sensing devices. The magnetic induction transceiver 212 may include, for example, transducers similar to those used for the short-range magnetic communications disclosed in U.S. Pat. Nos. 5,912,925; 5,982,764; and 7,254,366, all of which are incorporated herein by reference.

The transducer(s) 232 generate a quasistatic magnetic field in the near field and electromagnetic radiation may be minimized. When the size of the transducers are small compared to the proximity range of interest (as is the case of the applications described herein), the transducer magnetic field source can be approximated as a magnetic dipole. In such fields generated from a magnetic dipole, the magnitude of the field strength, H, has a relationship with distance from its source that is proportional to $1/d^3$ (i.e., magnetic field strength falls off proportional to the cubed distance from the source dipole). The use of a quasistatic magnetic field is advantageous because it is capable of being detected through the body and also because the field strength drops off rapidly with distance and is less likely to interact with other devices that are not within the proximity range, thereby providing a more reliable proximity detection particularly in a densely packed area. Quasistatic magnetic fields also do not reflect like radio waves and thus do not generate echoes and multipath phenomena that might increase false positive proximity detections.

The defined magnetic field range of the magnetic induction transceiver 230 may be configured, for example, as a function of the size of the wire coil and/or current supplied to the wire coil. For an application involving contact tracing to mitigate transmission of an infectious disease, the magnetic induction transceiver 230 may be configured or controlled to provide a defined magnetic field range that corresponds to the transmission range of the infectious disease. In some embodiments, the magnetic induction transceiver 230 may be configured to produce a quasistatic magnetic field with a defined magnetic field range of at least about 6 feet and more specifically within a range of about 6 to 9 feet or a range of about 6 to 12 feet. The power loss in the resistive components of a magnetic transducer and its associated electrical drive circuitry can present challenges when increasing the magnetic field strength to extend the range. Because the proximity magnetic communication has a relatively low bandwidth requirement (e.g., as compared to transmission of audio data), the power required for at least a 6 feet range may be achieved with currently available rechargeable batteries. Transmitting with non-continuous, high intensity signals may be possible given the low bandwidth requirement. In one example, a data packet is transmitted using high intensity magnetic signals during a 10 millisecond duration at a repetition rate of one data packet per second.

Increasing the magnetic field strength to increase the range may also present challenges with electric fields associated with drive voltages. Unwanted and/or additional electric fields can corrupt the $1/^3$ dipole relationship between magnetic field intensity and distance. A shield 233 may be used around the transducer(s) 232 to attenuate, outside of the shield volume, the corresponding quasistatic electric field associated with drive voltages on the coils making up the magnetic field generation transducers and on the signal traces connecting to these transducer components, with minimal impact on the magnetic field. The shield may also attenuate and prevent external interfering electric field components from being received on magnetic field receiving transducers. One implementation of this shield 233 may be a conductive enclosure where the thickness of the conductive shield material is a fraction of the skin depth of the conductive shield material. For example, the skin depth of copper is approximately 100 μm (micrometers) at 500 KHz. A shield enclosure made of copper that was <10 μm thick would significantly attenuate 500 KHz electric fields that penetrate the shield enclosure but would allow the magnetic fields to penetrate with minimal attenuation. An embodiment has a single shield enclosing a single set of transducer coils, whereby the single set of coils are used both for detection and for generation of magnetic fields.

Other methods to achieve this shielding effect may include the use of conductive coatings or the use of metal enclosures with hole patterns, gaps or cuts designed to similarly attenuate the electric field passing through the enclosure, while passing the magnetic field with minimal attenuation. Although the terms "shield" and "shielding" are used herein, this selective passing of magnetic signals with little attenuation while significantly attenuating electric field signals may also be referred to as filtering. Differential drive techniques may also be used to minimize the electric field strength outside the transducer(s) 232. Use of a differential signal to drive signals into the transducer can cause the electric fields from the two individual drive sources to cancel each other out at distances that are large compared to the differential drive signal spacing.

The transceiver 230 also includes transmit circuitry 234 and receive circuitry 236 connected to the transducer(s) 232, for example, to the wire coil. The magnetic induction transceiver 230 may communicate with other such transceivers through amplitude modulation of the magnetic fields, although other modulation methods may also be used such as frequency or phase modulation. The transmit circuitry 234 is configured to drive the transducer(s) 232 with a modulated electrical signal for generating a modulated magnetic field. The transmit circuitry 234 includes a digital-to-analog converter (DAC) function 235 for converting encoded digital signals (e.g., data packets with device identifiers) into analog signals for transmission via the transducer(s) 240. In one embodiment, the DAC may take the form of a one-bit digital output (one-bit converter).

The receive circuitry 236 is configured to receive a modulated electrical signal detected by the transducer(s) 232 when located within a modulated magnetic field generated by another transducer. The receive circuitry 236 may include an analog-to-digital converter (ADC) 237 for converting received analog signals (e.g., including data packets with device identifiers) into digital signals. The ADC may take the form of a comparator for the conversion of a modulated analog signal to a single-bit digital stream of information.

The processor(s) 240 (e.g., a microprocessor) may then digitally process, de-modulate, and/or operate on the ADC data outputs to generate the received data, process the received data, and log the processed data. The logged data for each proximity contact interaction may also be timestamped. In this embodiment, the processor(s) 240 include transmit signal digital processing circuitry 244 for processing the transmitted digital signal provided to the transmit circuitry 234 and receive signal digital processing circuitry 246 for processing the received digital signals from the receive circuitry 236. The receive signal digital processing circuitry 246 may also decode the data packets that are received to extract the device identifiers, the transmit signal strength, and any other information encoded. The receive signal digital processing circuitry 246 may also be configured to determine the detected magnetic field strength, which may then be used to estimate the proximal distance between the devices (e.g., proximity sensing devices 210-1, 210-2) when the strength of the generated magnetic field is known. Thus, the proximity sensing device 210 may be configured to estimate the distance to another proximity sensing device for purposes of proximity detection, without the proximity sensing devices having a defined magnetic field range.

Although bi-directional communication is not required, a two-way communication capability may be used to provide additional functionality and/or reliability. For example, if the signal received is strong, the receiver may request a transmission packet at reduced transmit strength to help confirm a distance measurement by having the additional received signal strength data point after a known reduction in transmit signal strength. The ability for limited two-way communication may also be useful in mitigating channel collisions. Two-way communication may be achieved, for example, using time multiplexing, different frequencies, and/or different transmitting and receiving transducers.

In other embodiments, the proximity sensing devices 210 may also include supplementary proximity sensing technology to enhance the proximity detection function. The supplementary proximity sensing technology may include, without limitation, acoustic signals (e.g., high frequency ultrasound), optical signals, and Bluetooth signals. The proximity sensing device 210 may be implemented, for example, in a mobile phone that includes Bluetooth such that the magnetic communication technology is used together with Bluetooth for proximity contact detections. Alternatively, a wearable proximity sensing device 210 may include Bluetooth such that the magnetic communication technology is used together with Bluetooth for proximity contact detections.

Figure 4:
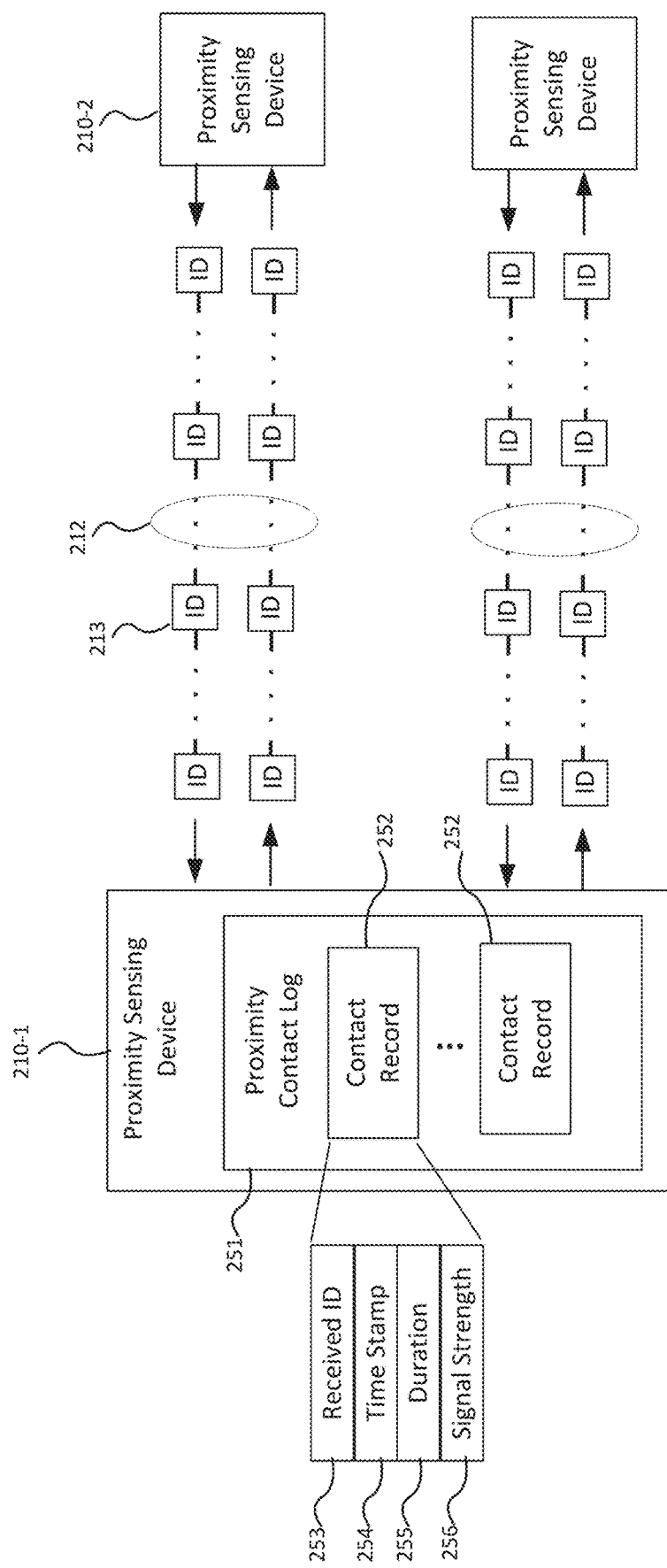
FIG. 4 is a schematic diagram illustrating data communicated between and logged by proximity sensing devices, consistent with embodiments of the present disclosure.

FIG. 4 illustrates an embodiment of the communication of data packets 213 between proximity sensing devices 210-1, 210-2 using a proximity magnetic communication 212 as described above. As shown, the data packets 213 include at least the device identifier (ID) and may also include other information such as transmitted signal strength. In some embodiments, the data packets may also contain encrypted data generated from an encryption key stored on the proximity sensing device. The data packets 213 may be transmitted by the proximity sensing devices 210-1, 210-2 periodically such that the periodic transmission of data packets 213 is received by the other proximity sensing device when located within the defined magnetic field range. In one example, the periodic transmission may include transmitting a data packet 213 every second with each data packet transmission occurring for 10 milliseconds. The repetition rate of the data packets 213 may be adjusted based upon a proximity sensing device having knowledge of other proximity devices that are in its range. In one example, the repetition rate may be slowed based upon an unchanging set of nearby proximity devices from once per second to once per two seconds. This could allow battery power consumption to be reduced, or transmit signal strength to be increased, based upon conditions.

The communicating proximity sensing devices 210-1, 210-2 may be configured, for example, using the circuitry and processors described above, to minimize or prevent collisions between the transmissions. The transmissions may also be frequency or time multiplexed, or some combination of frequency and time multiplexing, to form different channels to both avoid collisions and to allow for the mitigation of collisions if they occur. In an embodiment, the proximity sensing device 210-1 receiving the data packet transmission may detect an interference or overlap in the transmissions and the transmitting and/or receiving functions may be modified/mitigated to minimize or prevent the collisions where the modification involves changing the nearby device channels, or its own transmission channel.

When the proximity sensing device 210-1 receives and processes the data packets, the data may be stored in a proximity contact log 251 (e.g., stored in memory 250). The proximity contact log 251 may include contact records 252 containing, for example, the received device identifiers (IDs) 253, a time stamp 254 corresponding to the communication of the IDs, a time period or duration 254 of the communication, and other information indicative of the proximity such as signal strength 256.

Figure 5:
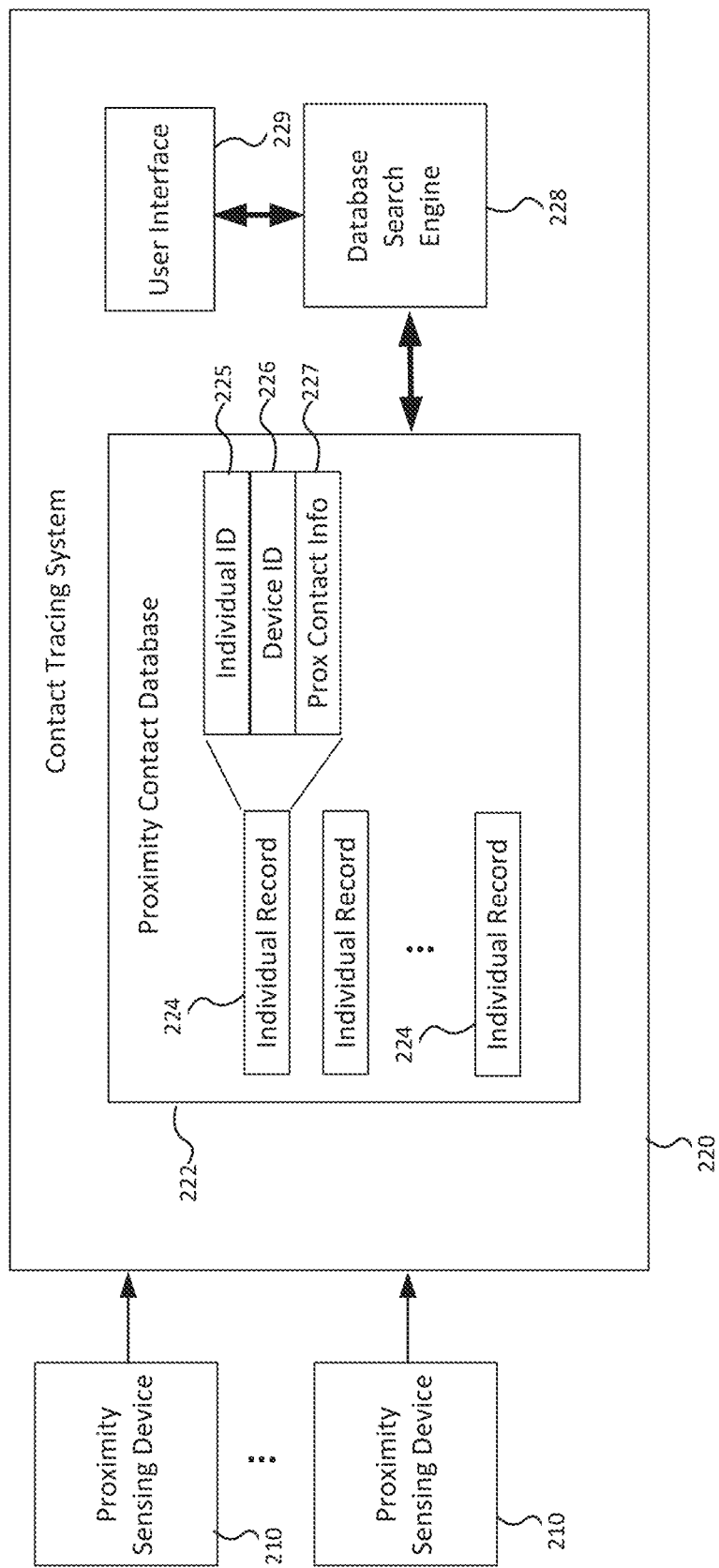
FIG. 5 is a schematic diagram of data stored in a contract tracing system, consistent with embodiments of the present disclosure.

FIG. 5 illustrates an embodiment of the proximity contact data stored in the contact tracing system 220. The contact tracing system 220 may include a proximity contact database 222 implemented, for example, using any commercially available database software on a computer system. The proximity contact database 222 includes individual records 224 corresponding to the individuals being tracked. The individual records 224 contain, for example, an individual ID 225 identifying the individual being tracked, a device ID 226 associated with a proximity sensing device worn by the individual, and proximity contact information 227. The proximity contact information 227 includes the proximity contact data communicated from the proximity sensing device worn by that individual and representing the proximity contact interactions that occurred when the individual was wearing the sensing device.

The contact tracing system 220 may also include static location records corresponding to the proximity contact interactions between the individuals and the fixed locations such as touch points. The static location records may contain a location ID corresponding to the location or touch point, a device ID associated with the static proximity sensing device at the fixed location or touch point, and proximity contact information. The proximity contact information includes the proximity contact data communicated from the proximity sensing device worn by the individuals who were within range of the static proximity sensing device.

The contact tracing system 220 may also include a database search engine 228 and user interface 229 to allow searching of the proximity contact database 222 to identify proximity contact interactions for a selected individual. In an application for contact tracing to mitigate transmission of an infectious disease, for example, an individual may be flagged in the proximity contact database 222 as a risk for transmission of the infectious disease (e.g., based on symptoms, exposure, diagnosis, positive test results, etc.). The database may then be searched using the at-risk individual ID to determine the proximity contacts for the at risk individual. The proximity contacts for the at-risk individual may then be used to identify other individuals who have had a proximity contact interaction with the at risk individual such that the other individuals may take steps to prevent further transmission, such as isolation, quarantine, testing, etc. The proximity contacts for the at-risk individual may also be used to identify the fixed locations or touch points where the at risk individual was located and the other individuals who have been at those locations.

Although a particular application of contact tracing to prevent transmission of an infectious disease is described herein, the devices, systems and methods described herein may also be used in other applications where there is a need for tracking proximity of individuals or objects. For example, the proximity sensing devices may be used with robots where many robots are operated simultaneously, such as a shipping and distribution center, to provide local collision avoidance and traffic management. In such an application, the proximity sensing devices may be used with both the robots and with individuals to provide the robots with a proximity detection system for human workers in the same space and improve safety.

In another example, proximity sensing devices may be used with unmanned aerial vehicles (UAVs) to provide local collision avoidance and coordination of flight between swarms of UAVs and/or to aid in formation flying for such systems. In these applications, full duplex communication may be used to improve control bandwidth options. Other applications are also possible and contemplated, although not explicitly described herein.

As used in any embodiment herein, "circuit" and "circuitry" may include, for example, singly or in any combination, analog circuitry, digital circuitry, hardwired circuitry, programmable circuitry such as a microcontroller, programmable logic (CPLD, FPGA, etc.), state machine circuitry, and/or firmware that stores instructions executed by programmable circuitry. "Integrated circuit", as used in any embodiment herein, may include a circuit or circuitry in the form of a semiconductor device and/or microelectronic device, such as, for example, a semiconductor integrated circuit chip or application specific integrated circuit (ASIC). The transmit and receive circuitry and digital processing circuitry may be implemented as any circuit or circuitry, including an integrated circuit, configured to perform the functions described herein. Those skilled in the art will recognize various implementations for the circuitry including any combination of hardware, software and firmware that is configured or programmed to perform the functions described herein. Although the illustrated embodiments show discrete blocks representing circuitry that performs various functions, the circuitry is not necessarily located in a discrete unit and the arrangement of the circuitry is not intended to be a limitation of the present disclosure.

As will be appreciated by one skilled in the art, embodiments of the present disclosure may include methods, systems, or computer program products. Accordingly, embodiments of the present invention may take the form of hardware, software, firmware, or any combination thereof, which may generally be referred to herein as a "circuit," "module" or "system." Furthermore, embodiments of the present disclosure may take the form of a computer program product on a tangible, non-transient computer-usable storage medium having computer-usable program code embodied in the medium.

Any suitable computer usable or computer readable medium in the form of an article of manufacture may be utilized. The computer readable medium may be, for example but not limited to, an electronic, magnetic, optical, electromagnetic, infrared, or semiconductor system, apparatus, device, or tangible propagation medium. More specific examples (a non-exhaustive list) of the computer-readable medium would include the following: an electrical connection having at least one wire, a portable computer diskette, a hard disk, a random access memory (RAM), a read-only memory (ROM), an erasable programmable read-only memory (EPROM) or Flash Memory, an optical fiber, a portable compact disc read-only memory (CD-ROM), an optical storage device, a transmission media such as those supporting the Internet or an intranet, or a magnetic storage device. Examples of computer executable instructions may include any suitable type of code, such as source code, compiled code, interpreted code, executable code, static code, dynamic code, object-oriented code, visual code, and the like.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A system for sensing and tracing proximity contacts, the system comprising:
a plurality of proximity sensing devices configured to perform a proximity magnetic communication when located within a magnetic field range during a proximity contact interaction, the proximity magnetic communication including at least a device identifier of the proximity sensing devices performing the proximity magnetic communication, each of the proximity sensing devices also being configured to store proximity contact data including at least the received device identifiers, wherein each of the proximity sensing devices includes:
a magnetic induction transceiver configured to transmit and receive using a modulated magnetic field to perform the proximity magnetic communication, wherein the transceiver includes at least one transducer configured to generate a magnetic field extending over the defined magnetic field communication range and configured to generate current and/or voltage when located within a magnetic field generated by a transducer in another proximity sensing device;
at least one processor configured to process received and transmitted data; and a memory configured to store the proximity data including at least the received device identifiers; and a contact tracing system configured to communicate with the proximity sensing devices and to log proximity contact data received from each of the proximity sensing devices, the proximity contact data includes a device identifier for each proximity sensing device and the received device identifiers received by each proximity sensing device from other proximity sensing devices as a result of proximity magnetic communications.

2. The system of claim 1 wherein the magnetic field range is a defined magnetic field range.

3. The system of claim 2 wherein the defined magnetic field range is at least 6 feet.

4. The system of claim 2 wherein the defined magnetic field range is in the range of 6 to 12 feet.

5. The system of claim 2 wherein the defined magnetic field range corresponds to a transmission range of an infectious disease.

6. The system of claim 1 wherein the proximity sensing devices are configured to estimate a distance between the proximity sensing devices within the magnetic field range.

7. The system of claim 1 wherein a plurality of the proximity sensing devices are wearable devices configured to be worn or carried by individuals, wherein the contact tracing system is configured to store individual identifiers associated with the individuals wearing the proximity sensing devices, and wherein the contact tracing system is configured to identify proximity contact interactions for a selected individual identifier.

8. The system of claim 7 wherein at least one of the proximity sensing devices is a static proximity sensing device at a fixed location.

9. The system of claim 1 further comprising a shield around the transducer(s) to attenuate any corresponding quasistatic electric field with minimal impact on the magnetic field.

10. The system of claim 1 wherein each of the proximity sensing devices are configured to transmit the device identifier periodically.

11. The system of claim 1 wherein the proximity contact data includes a time stamp for the proximity magnetic communication.

12. The system of claim 1 wherein the proximity contact data includes a duration for the proximity magnetic communication.

13. The system of claim 1 wherein the proximity contact data includes a signal strength for the proximity magnetic communication.

14. A system for sensing and tracing proximity contacts, the system comprising:

a plurality of proximity sensing devices configured to perform a proximity magnetic communication when located within a magnetic field range during a proximity contact interaction, the proximity magnetic communication including at least a device identifier of the proximity sensing devices performing the proximity magnetic communication, each of the proximity sensing devices also being configured to store proximity contact data including at least the received device identifiers, wherein at least one of the proximity sensing devices comprises:

a magnetic induction transceiver comprising:

at least one transducer configured to generate a quasistatic magnetic field extending over the magnetic field range and configured to generate current and/or voltage when located within a quasistatic magnetic field generated by another transducer in another of the proximity sensing devices;

transmit circuitry coupled to the transducer and configured to drive the transducer with a modulated electrical signal;

receive circuitry coupled to the transducer and configured to receive a modulated electrical signal when the transducer detects the magnetic field generated by the transducer in the other of the proximity sensing devices;

a processor coupled to the transmit circuitry and to the receive circuitry and configured to process a transmit digital signal encoding at least a device identifier for transmission by the transmit circuitry and configured to process a received digital signal to decode a received device identifier; and a memory configured to store proximity data including at least the received device identifiers; and a contact tracing system configured to communicate with the proximity sensing devices and to log proximity contact data received from each of the proximity sensing devices, the proximity contact data includes a device identifier for each proximity sensing device and the received device identifiers received by each proximity sensing device from other proximity sensing devices as a result of proximity magnetic communications.

15. The system of claim 14 wherein the at least one of the proximity sensing devices further comprises a shield around the at least one transducer to attenuate any corresponding quasistatic electric field with minimal impact on the magnetic field.

16. The system of claim 14 wherein the at least one transducer is configured to generate the quasistatic magnetic field extending over a defined range corresponding to a transmission range of an infectious disease.

17. The system of claim 14 wherein the at least one transducer is configured to generate the quasistatic magnetic field extending over a range of at least 6 feet.

* * * * *